United States Patent [19]

Fischer et al.

[11] 4,358,321

[45] Nov. 9, 1982

[54] LEAD-FREE CERAMIC PINK-COLORING MATERIAL CONSISTING OF CHROMIUM-TIN-CALCIUM-SILICON-ALKALI METAL OXIDE PLUS BISMUTH AND/OR PHOSPHORUS OXIDE AND PROCESS

[75] Inventors: Robert Fischer, Obertshausen; Heinz-Dieter DeAhna, Egelsbach, both of Fed. Rep. of Germany

[73] Assignee: Degussa Aktiengesellschaft, Frankfurt, Fed. Rep. of Germany

[21] Appl. No.: 272,084

[22] Filed: Jun. 10, 1981

[30] Foreign Application Priority Data

Jun. 26, 1980 [DE] Fed. Rep. of Germany ....... 3023941

[51] Int. Cl.³ ........................... C09C 1/34; C09C 3/06
[52] U.S. Cl. .................................... 106/302; 106/299; 106/306
[58] Field of Search ...................... 106/302, 299, 306; 501/17, 18

[56] References Cited

U.S. PATENT DOCUMENTS

| 2,234,920 | 3/1941 | Stillwell | 106/302 |
| 2,419,094 | 4/1947 | Sloan | 106/302 |
| 3,053,685 | 9/1962 | Jamieson | 106/302 X |
| 3,171,753 | 3/1965 | Olby | 106/302 X |

FOREIGN PATENT DOCUMENTS

| 384473 | 12/1932 | United Kingdom | 106/306 |
| 952122 | 3/1964 | United Kingdom | 106/299 |
| 1117598 | 6/1968 | United Kingdom | 106/302 |

OTHER PUBLICATIONS

Parmelee, C. W. *Ceramic Glazes*—2nd ed. pub. 1951 by Industrial Publications, Chicago, pp. 279–280.

*Primary Examiner*—Helen M. McCarthy
*Attorney, Agent, or Firm*—Cushman, Darby & Cushman

[57] ABSTRACT

Ceramic pink-colored materials having the basis Ca-Sn-Cr-oxide, Ca-Sn-Si-Cr-oxide and Zr-Ti-Sn-Cr-oxide generally containing lead for the formation of an intense red color. The toxic lead can be eliminated by adding to the colored bodies 0.01–10% bismuth and/or phosphorus.

9 Claims, No Drawings

LEAD-FREE CERAMIC PINK-COLORING MATERIAL CONSISTING OF CHROMIUM-TIN-CALCIUM-SILICON-ALKALI METAL OXIDE PLUS BISMUTH AND/OR PHOSPHORUS OXIDE AND PROCESS

BACKGROUND OF THE INVENTION

The present invention is directed to ceramic pink-colored materials based on calcium-tin-silicon-chromium oxide and zirconium-titanium-tin-chromium oxide which can be produced without addition of lead compounds.

Pink-colored bodies are employed for the coloration of ceramic glazes as well as for the production of colors for the decoration of stoneware and porcelain. Pink-colored bodies, e.g. of the system calcium-tin-silicon-chromium oxide according to the previous processes of production are only producible as intense red-coloring matter in the presence of lead and alkali compounds, e.g. carbonate or nitrate as mineralizer. The use of these coloring materials or colors producible therefrom on materials which come into contact with food, e.g. stoneware or porcelain vessels, therefore is excluded because of the dangers from the lead in these colors. Boric acid containing lead free pink-coloring material described in the literature [P. Eisbein, Keramische Zeitschrift 23, 214 (1971) and A. Burgyan, Interceram 1, 30, (1979)] are considerably more weakly colored and for that reason are poorly suited for decorative purposes on ceramic products.

Therefore it was the problem of the present invention to develop pink-coloring material for ceramics based on calcium-tin-silicon-chromium oxide or zirconium-titanium-tin-chromium oxide which on the one hand are lead free and on the other are intensely red-colored. Additionally, the material should have a good stability for the broadest possible areas of use, e.g. on porcelain at firing temperatures up to 1300° C.

SUMMARY OF THE INVENTION

This problem was solved according to the invention by providing that the coloring material additionally contain 0.01 to 10 weight % of bismuth and/or phosphorus. Preferably these coloring materials contain 0.1 to 5% of bismuth and/or phosphorus, particularly in the form of their oxide. Additions of bismuth oxide (bismuth trioxide) and/or alkali phosphates (e.g. trisodium phosphate, tripotassium phosphate).

The coloring materials according to the invention are intensely red-colored and possess a tinting strength at least as high as that of the coloring materials, which were produced with lead compounds as mineralizer together simultaneously with uniformly improved firing stability. Through this there is possibly a use of these colored materials, both in the decorative fired porcelain and also for the firing of earthenware, stoneware and sanitaryware.

The production of the coloring materials of the invention preferably takes place by mixing the finely powdered starting compounds which are present in the form oxides or oxide forming compounds and subsequently calcining at 1000° C. to 1400° C., the preferred calcining range is at 1250° to 1380° C.

As starting compounds there are used the oxides or oxide forming compounds of calcium, silicon, tin, titanium, and zirconium. The preceding mentioned compounds are preferably employed in such manner that the oxides formed therefrom are present in about equal molar proportions.

As coloring imparting compounds there are employed oxides or oxide forming compounds of chromium in amount up to 5%. As mineralizer according to the invention there is used a compound of the element phosphorus and/or bismuth in an amount that the oxide content is up to 20% of the total oxide content. The presence of alkali ions, e.g. sodium or potassium ions improves the development of color. After the calcination of the mixture there is obtained a very intense red-colored material which contains up to 10% bismuth and/or phosphorus.

As compounds of the elements phosphorus and bismuth there are preferably employed alkali phosphates, e.g. sodium phosphate and potassium phosphate and bismuth oxide.

Similar results are produced with oxide forming compounds of antimony. The use of antimony doped pink-coloring materials, however, is excluded in many cases because of health consideration.

The compositions consist essentially of or consist of the stated materials.

Unless otherwise indicated all parts and percentages are by weight.

The following examples describe the colored materials of the invention and their production in more detail.

DETAILED DESCRIPTION

Example 1

61.0 grams of tin oxide (stannic oxide), 47.2 grams of calcium carbonate, 36.6 grams of silica and 1.9 grams of chromium oxide (chromic oxide) were mixed together with 2.7 grams of potassium nitrate and 2.8 grams of bismuth oxide and finely ground.

The mixture was then calcined for one hour at 1340° C. The calcined product was ground, washed and dried. There was obtained a very intensely red-colored material which contained 0.2 weight percent of bismuth according to analysis.

Example 2

61.0 grams of tin oxide (stannic oxide), 47.2 grams of calcium carbonate, 36.6 grams of silica, and 1.6 grams of chromium oxide (chromic oxide) were wet mixed together with 0.9 grams of bismuth nitrate and 2.7 grams of potassium carbonate and finely ground. The mixture was further treated as in Example 1. There was obtained an intensely red-colored material which contained 0.14 weight percent of bismuth.

Example 3

58.0 grams of tin oxide (stannic oxide), 47.0 grams of calcium carbonate, 38.0 grams of silica and 1.6 grams of chromic oxide were further processed together with 15.0 grams of bismuth oxide and 4.2 grams of sodium nitrate were added in the manner given in Example 1. There was obtained a red-colored coloring material which contained 5.3 weight percent of bismuth.

Example 4

40.1 grams of tin oxide (stannic oxide), 30.9 grams of calcium carbonate, 23.9 grams of silica, 1.7 grams of ammonium nitrate, 1.0 gram of chromic oxide, 0.8 gram of bismuth oxide and 1.6 grams of potassium phosphate were processed as in Example 1. There was obtained a dark red-coloring material having a bismuth content of 0.09% and a phosphorus content of 0.5%.

To determine the color value with the Hunter apparatus coloring material from the productions of the above-cited examples were employed in a glaze. For this purpose ten % coloring material was incorporated in a transparent glaze suited for pink-coloring material. The results are set forth in the Table.

|  | L | a | b |
|---|---|---|---|
| Coloring material with lead mineralizer | 17.1 | 22.7 | 5.2 |
| Coloring material produced according to Example 1 | 17.4 | 23.6 | 5.5 |
| Coloring material without mineralizer | 19.5 | 20.4 | 4.7 |

The entire disclosure of German priority application No. P 3023941.9 is hereby incorporated by reference.

What is claimed is:

1. In a lead-free ceramic pink-coloring material consisting of calcium oxide, tin oxide, silica, chromium oxide, and alkali metal oxide, the improvement of an addition from about 0.1 to 10% bismuth, phosphorus, or a mixture of bismuth and phosphorus, the bismuth being in the form of an oxide or an oxide forming compound and the phosphorus being in the form of an oxide or alkali metal phosphate.

2. A ceramic pink-coloring material according to claim 1 wherein the added material is bismuth.

3. A ceramic pink-coloring material according to claim 1 wherein the added material is phosphorus.

4. A ceramic pink-coloring material according to claim 1 wherein the added material is a mixture of bismuth and phosphorus.

5. A ceramic pink-coloring material according to claim 1 containing 0.1 to 5% of bismuth, phosphorus, or a mixture of bismuth and phosphorus.

6. A ceramic pink-coloring material according to claim 5 containing 0.1 to 5% of phosphorus as phosphorus pentoxide or alkali metal phosphate.

7. A process of preparing the pink-coloring material of claim 1 comprising calcining at a temperature of 1000° to 1400° C. a mixture of calcium, tin, chromium, silicon, and alkali metal compounds in the presence of an oxide or oxide-forming compound of phosphorus, bismuth, or a mixture of phosphorus and bismuth in an amount up to 20%.

8. A process according to claim 7 wherein there is employed bismuth oxide, alkali metal phosphate, or a mixture of bismuth oxide and alkali metal phosphate.

9. A process according to claim 8 wherein the calcining is at 1250° to 1380° C.

* * * * *